(12) United States Patent
Gross et al.

(10) Patent No.: US 12,234,831 B2
(45) Date of Patent: Feb. 25, 2025

(54) PUMP SHAFT FOR A MULTI-STAGE PUMP

(71) Applicant: KSB SE & Co. KGaA, Frankenthal (DE)

(72) Inventors: Gerhard Gross, Frankenthal (DE); Kai Molitor, Frankenthal (DE); Sophia Sergi, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 68 days.

(21) Appl. No.: 17/597,268

(22) PCT Filed: Jun. 22, 2020

(86) PCT No.: PCT/EP2020/067302
§ 371 (c)(1),
(2) Date: Dec. 30, 2021

(87) PCT Pub. No.: WO2021/001191
PCT Pub. Date: Jan. 7, 2021

(65) Prior Publication Data
US 2022/0316490 A1   Oct. 6, 2022

(30) Foreign Application Priority Data
Jul. 1, 2019   (DE) .................. 10 2019 004 539.4

(51) Int. Cl.
*F04D 29/043* (2006.01)
*F04D 1/06* (2006.01)
(Continued)

(52) U.S. Cl.
CPC ............. *F04D 29/043* (2013.01); *F04D 1/06* (2013.01); *F04D 13/021* (2013.01); *F04D 13/10* (2013.01);
(Continued)

(58) Field of Classification Search
CPC .......... F04D 1/06; F04D 29/043; F04D 13/10; F04D 13/021; F04D 29/044;
(Continued)

(56) References Cited

U.S. PATENT DOCUMENTS 1,414,207 A * 4/1922 Reed ...................... E21B 17/06
403/324
1,499,056 A   6/1924 Hollander
(Continued)

FOREIGN PATENT DOCUMENTS

| CH | 376 774 A | 4/1964 |
|----|-----------|--------|
| CN | 109469624 A | 3/2019 |

(Continued)

OTHER PUBLICATIONS

International Preliminary Report on Patentability (PCT/IB/338 & PCT/IB/373) issued in PCT Application No. PCT/EP2020/067302 dated Jan. 13, 2022, including English translation of document C2 (German-language Written Opinion (PCT/ISA/237) filed on Dec. 30, 2021) (six (6) pages).

(Continued)

*Primary Examiner* — Peter J Bertheaud
(74) *Attorney, Agent, or Firm* — Crowell & Moring LLP

(57) ABSTRACT

A pump shaft for a multi-stage pump, in particular a centrifugal pump, includes a peripheral groove region for the engagement of a relief device in order to introduce a force acting in the axial direction of the pump shaft. The groove region includes a plurality of grooves which are spaced apart in the axial direction.

18 Claims, 3 Drawing Sheets

(51) Int. Cl.
| | |
|---|---|
| *F04D 13/02* | (2006.01) |
| *F04D 13/10* | (2006.01) |
| *F04D 17/12* | (2006.01) |
| *F04D 29/041* | (2006.01) |
| *F04D 29/044* | (2006.01) |
| *F04D 29/62* | (2006.01) |
| *F16D 1/033* | (2006.01) |
| *F16D 1/04* | (2006.01) |
| *F16D 1/05* | (2006.01) |
| *F16D 1/08* | (2006.01) |
| *F16D 1/09* | (2006.01) |
| *F16D 1/096* | (2006.01) |

(52) U.S. Cl.
CPC ........... *F04D 17/12* (2013.01); *F04D 29/041* (2013.01); *F04D 29/044* (2013.01); *F04D 29/628* (2013.01); *F16D 1/033* (2013.01); *F16D 1/04* (2013.01); *F16D 1/05* (2013.01); *F16D 1/0829* (2013.01); *F16D 1/0864* (2013.01); *F16D 1/09* (2013.01); *F16D 1/096* (2013.01)

(58) Field of Classification Search
CPC ...... F04D 29/041; F04D 29/628; F04D 17/12; F16D 1/033; F16D 1/0864; F16D 1/096; F16D 1/04; F16D 1/09; F16D 1/05; F16D 1/0829
See application file for complete search history.

(56) References Cited

U.S. PATENT DOCUMENTS

| | | | |
|---|---|---|---|
| 1,927,543 | A | 9/1933 | Doyle |
| 1,978,814 | A * | 10/1934 | Myers ..................... F16D 1/12 411/116 |
| 3,387,869 | A * | 6/1968 | Allen ..................... F16D 1/033 403/106 |
| 5,655,849 | A | 8/1997 | McEwen et al. |
| 2010/0322765 | A1 | 12/2010 | Markwalder et al. |
| 2012/0189452 | A1 | 7/2012 | Paddock |
| 2017/0248001 | A1 | 8/2017 | Parks et al. |

FOREIGN PATENT DOCUMENTS

| | | |
|---|---|---|
| DE | 10 2008 013 433 A1 | 9/2009 |
| EP | 3 412 915 A1 | 12/2018 |
| RU | 2 663 541 C2 | 8/2014 |
| RU | 2 646 881 C1 | 3/2018 |
| RU | 185 434 U1 | 12/2018 |

OTHER PUBLICATIONS

International Search Report (PCT/ISA/210) issued in PCT Application No. PCT/EP2020/067302 dated Sep. 15, 2020 with English translation (four (4) pages).

German-language Written Opinion (PCT/ISA/237) issued in PCT Application No. PCT/EP2020/067302 dated Sep. 15, 2020 (five (5) pages).

German-language Office Action issued in German Application No. 10 2019 004 539.4 dated Apr. 30, 2020 (four (4) pages).

Russian-language Office Action issued in Russian Application No. 2021136001/12(075922) dated Oct. 23, 2023 (2 pages).

* cited by examiner

PRIOR ART

PUMP SHAFT FOR A MULTI-STAGE PUMP

BACKGROUND AND SUMMARY OF THE INVENTION

The present invention relates to a pump shaft for a multi-stage pump and to a pump having such a pump shaft.

In pumps, in particular in centrifugal pumps, a fluid to be pumped is sucked in with the aid of a rotating shaft and displaced by an impeller driven by means of the shaft.

Because a lower pressure and hence a lower force in the axial direction are formed on the suction side at the impellers in multi-stage pumps, due to the impeller inlet opening, an axial force is always created in the direction of the suction side. This axial force of the impellers is imparted to the shaft. So that the shaft can be held stationary in the casing, a hydraulically generated counter-force is introduced into the pump shaft by means of a load-relieving device.

In the multi-stage pumps, the load-relieving device is connected to the shaft by a split ring and a retaining ring groove in the pump shaft. Engagement in this groove prevents undesired axial displacement of the pump shaft relative to the casing.

It is a disadvantage here that shaft breakages rarely to occasionally occur at this location. This is evidence of a certain weak point in the shaft owing to the retaining ring groove. Because it has been more and more common for some years for multi-stage pumps to be stopped and restarted in the energy generation field, the retaining ring groove is mechanically highly stressed such that a growing and serious problem with the availability of durable pumps under the altered operating conditions has been observed. The required safety factor for fatigue fracture is thus often no longer obtained.

The object of the present invention is to overcome this disadvantage. This occurs with a pump shaft which has all the features of claim 1 or with a pump as claimed in claim 11. The invention significantly improves this weak point and obtains, inter alia, a significant improved durability of the pump shaft. Further advantageous embodiments of the invention are formulated in the dependent claims.

According to the invention, it is provided that the pump shaft for a multi-stage pump, in particular a centrifugal pump, comprises a circumferential groove region for engagement of a load-relieving device in order to impart a force acting in the axial direction of the pump shaft to a pump shaft. The pump shaft is characterized in that the groove region has, in a view of the pump shaft in longitudinal section, a plurality of grooves spaced apart from one another in the axial direction.

In contrast to the previously known prior art, the retaining ring groove for engagement of a load-relieving device is now no longer formed just by a single groove and instead, when viewed in a direction of longitudinal section of the pump shaft, a plurality of grooves arranged next to one another. By virtue of providing the plurality of grooves arranged next to one another in the axial direction of the pump shaft, it is possible for the cross-sectional area of the pump shaft to be configured to be larger in the groove region than would be possible in the case of just one groove which consequently also projects deeper into the pump shaft. As a result, a tendency of the pump shaft to break at the groove region is effectively counteracted. The average stress in this region is also similarly reduced.

In contrast to the prior art, the large axial force is imparted not to one large groove but to a plurality of smaller grooves in the shaft and is immediately redirected in the opposite direction. This force deflection generates high stresses in the groove radius of the shaft. In the case of multiple grooves, only a small part of the axial force is imparted and redirected per groove and the remaining axial force is passed through. This significantly reduces the stress in the groove bottom and entails that, owing to this new design of the groove, the maximum stress in the groove bottom (also, groove base) of the shaft is significantly less, namely can be more or less halved.

It is also possible to increase the contact surface between the load-relieving device, engaging in the grooves, and the shaft owing to the new, smaller grooves. The surface pressure in the contact surfaces is thus reduced significantly. In initial calculations, this results in a reduction of the surface pressure in the contact surfaces by approximately half.

The plurality of grooves are preferably formed by respective circumferential grooves separated from one another or by a single-start or multi-start closed screwthread.

It can be provided here that the plurality of grooves define between their groove bases at least one ridge with a height which corresponds to that of the outer edges of the groove region. In other words, each of the plurality of grooves here means that the at least one raised portion (relative to the groove bases) situated between the grooves is arranged at the same height level as the adjoining regions of the groove region. The ridges arranged between the grooves are therefore not arranged at a lower level than the outer edges of the groove region.

According to an advantageous modification of the invention, it can be provided that a respective groove base of the plurality of grooves is configured in the shape of a segment of a circle, viewed in longitudinal section. This results in an advantageous recess in which an element engaging in the groove base can transmit a high axial force.

It can be provided here that the radii of the groove bases in the shape of segments of a circle are different, wherein such a radius of a groove arranged at the outer edge of the groove region is preferably larger than a radius of a groove arranged in a central section of the groove region.

A groove arranged at the edge of the groove region can thus have a groove base, the longitudinal section of which, in the shape of a segment of a circle, has a larger radius than another groove base arranged in the groove region. It is particularly advantageous here if the groove with the larger groove base in the shape of a segment of a circle is arranged at that side or edge of the groove region which faces the piston of the pump.

The different radii in the groove bases in the shape of segments of a circle allow force to be imparted to the pump shaft in a relatively uniform manner.

According to a further optional development of the invention, it can be provided that the groove depths of the plurality of grooves are different, wherein preferably a groove depth of a groove arranged at the outer edge of the groove region is preferably less than the groove depth of another groove arranged in the groove region. It is advantageous here if the groove depth is smaller for the groove which is arranged on that side of the groove region which faces the piston. However, it can moreover be provided that the grooves are provided at the edge (viewed in the direction of longitudinal section) of the groove region with a less deep groove base than the one(s) in a central region of the groove region.

According to a modification of the invention, it can be provided that the plurality of grooves are separated from one another in the longitudinal direction of the pump shaft by a pump shaft section with a radius from the axis of rotation of the pump shaft which coincides with a radius of the pump shaft which adjoins the groove region.

According to a further preferred embodiment, the plurality of grooves represent, in a view of the pump shaft in longitudinal section, a sawtooth structure, wherein the respective tooth tips of the sawtooth structure preferably all have the same radius with respect to the axis of rotation of the pump shaft. The sawtooth structure is here directed with its steep flanks facing the piston of the pump because the force which is to be imparted to the pump shaft comes from the piston.

Grooves similar to the sawtooth thread according to DIN 2781 are in particular suited because almost no radial force impart to a load-relieving device engaging in the grooves such that such a sawtooth shape is ideally configured for the loading situation in the present case.

It can additionally be provided according to the invention that at least one of the respective tooth bases of the sawtooth structure has a larger radius with respect to the axis of rotation of the pump shaft than at least one other tooth base of the sawtooth structure.

It can also be provided that the at least one tooth base with a smaller radius is separated from an outer, viewed in a longitudinal section, edge of the groove region by at least one tooth base with a larger radius, wherein the at least one tooth base with a smaller radius is preferably separated from both outer, viewed in a longitudinal section, edges of the groove region by in each case at least one tooth base, preferably at least two tooth bases, with a larger radius.

According to a further development of the invention, it can be provided that a load-relieving groove, which does not serve for engagement of a load-relieving device, is provided in the pump shaft, adjoining the groove region for engagement of a load-relieving device, wherein a load-relieving groove is preferably provided in the pump shaft at both outer edge regions of the groove region.

This causes stress in the grooves of the shaft to be reduced such that an even more resistant design of the pump shaft is obtained.

It can be provided here that the at least load-relieving groove has a similar depth to the grooves of the groove region.

The at least one load-relieving groove can here be configured in a longitudinal cross-section such that it slopes steeply on its groove side spaced apart from the groove region and is configured to be less steep on its groove side facing the groove region.

The invention relates to a pump, in particular a centrifugal pump, comprising a pump shaft according to one of the preceding alternative embodiments, and to a load-relieving device which engages in the plurality of grooves of the groove region in order to impart a force acting on the load-relieving device in the axial direction of the pump shaft to the pump shaft.

It can be provided here that the load-relieving device is a split ring which surrounds the pump shaft with its two partial ring pieces in the circumferential direction and is formed on its inner circumference in order to engage in the plurality of grooves of the groove region. However, the load-relieving device can also be with a similarly designed, one-part ring instead of the split ring. A similar thread is then also present here.

According to an optional modification of the invention, it is provided that the load-relieving device has, viewed in a longitudinal section, a thread element for engagement in a corresponding groove for at least one or all the grooves of the groove region.

It can be provided here that one of the plurality of thread elements is radially shortened, i.e. penetrates less deeply with respect to the axis of rotation of the pump shaft than another thread element, wherein such a radially shortened thread element preferably engages in a groove arranged at the edge of the groove region, in particular in that groove of the groove region situated closest to the piston.

It can also be provided that there are two radially shortened thread elements which adjoin each other and engage in the two grooves of the groove region which are situated at the edge and are preferably situated on that side of the groove region which faces away from the piston.

The piston is here arranged on that side of the groove region which faces the force to be imparted to the pump shaft and imparts this force to the split ring.

It is preferably provided that the thread elements are the radially shortened thread elements engage in grooves at the two edges of the groove region. It is therefore also possible that at both edge sections (when viewed in a longitudinal section), both edge regions of the load-relieving device are provided with at least one radially shortened thread element and the unshortened thread elements are arranged only in a central section of the load-relieving device.

It can also be provided that the thread elements are configured with the shape of segments of a circle, wherein in particular some or all of the radially shortened thread elements have a larger diameter than the radially normal thread elements.

The diameters of those thread elements which engage in grooves which are arranged at the outer edge of the groove region are preferably configured so that they are enlarged. It is also possible that such a thread element has an enlarged diameter and engages in the groove arranged at the edge of the groove region and facing the piston.

Other details, advantages, and features of the invention can be seen with the aid of the following description of the drawings.

DETAILED DESCRIPTION

Figure 1:
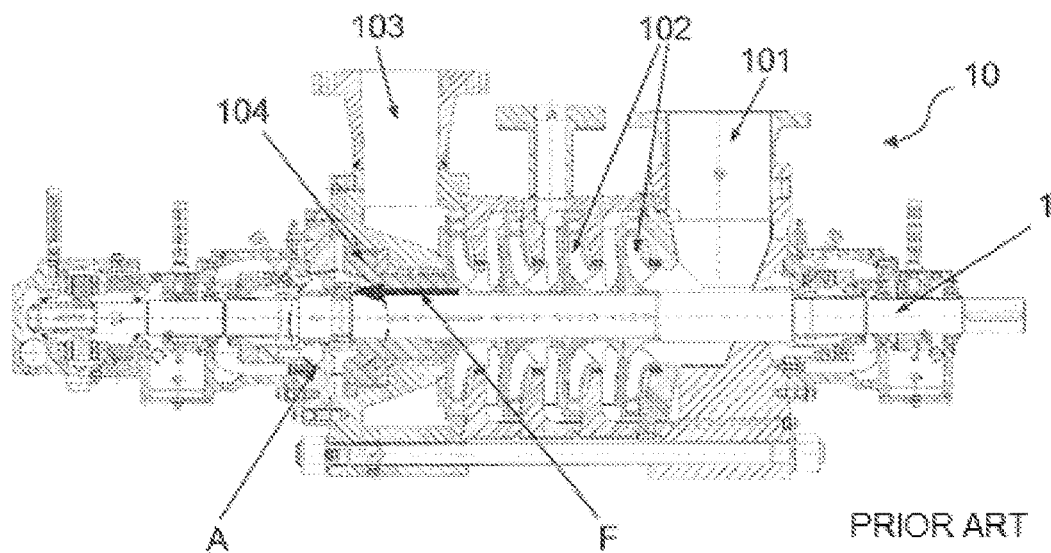
FIG. 1 shows a view in longitudinal section of a conventional pump.

FIG. 1 shows a longitudinal section along the pump shaft 1 of a pump 10. By rotating the pump shaft 1, the impellers 102 which displace a fluid to be displaced are set in rotation. There is an inlet 101 here and a plurality of pump stages arranged in a row which are each provided with impellers 102 rotating about the pump shaft 1.

After the impellers 102 situated furthest downstream, the pumped fluid leaves the pump 10 via an outlet 103.

When the fluid is pumped, a force F parallel to the pump shaft is created which is imparted to the pump shaft 1 via a piston 104. Undesired relative movement of the pump shaft and other components of the pump 10 is consequently prevented.

The force F is here imparted by a reduced cross-section of the pump shaft 1 in which a load-relieving device 3 engages.

The latter is thus not movable in the axial direction of the pump shaft. However, rotation of the pump shaft 1 is not affected as a result.

The groove in the pump shaft 1 of the pump 10 is highly stressed owing to the fact that it receives the axial thrust F and for this reason is also a potential location of a shaft breakage.

Figure 2:
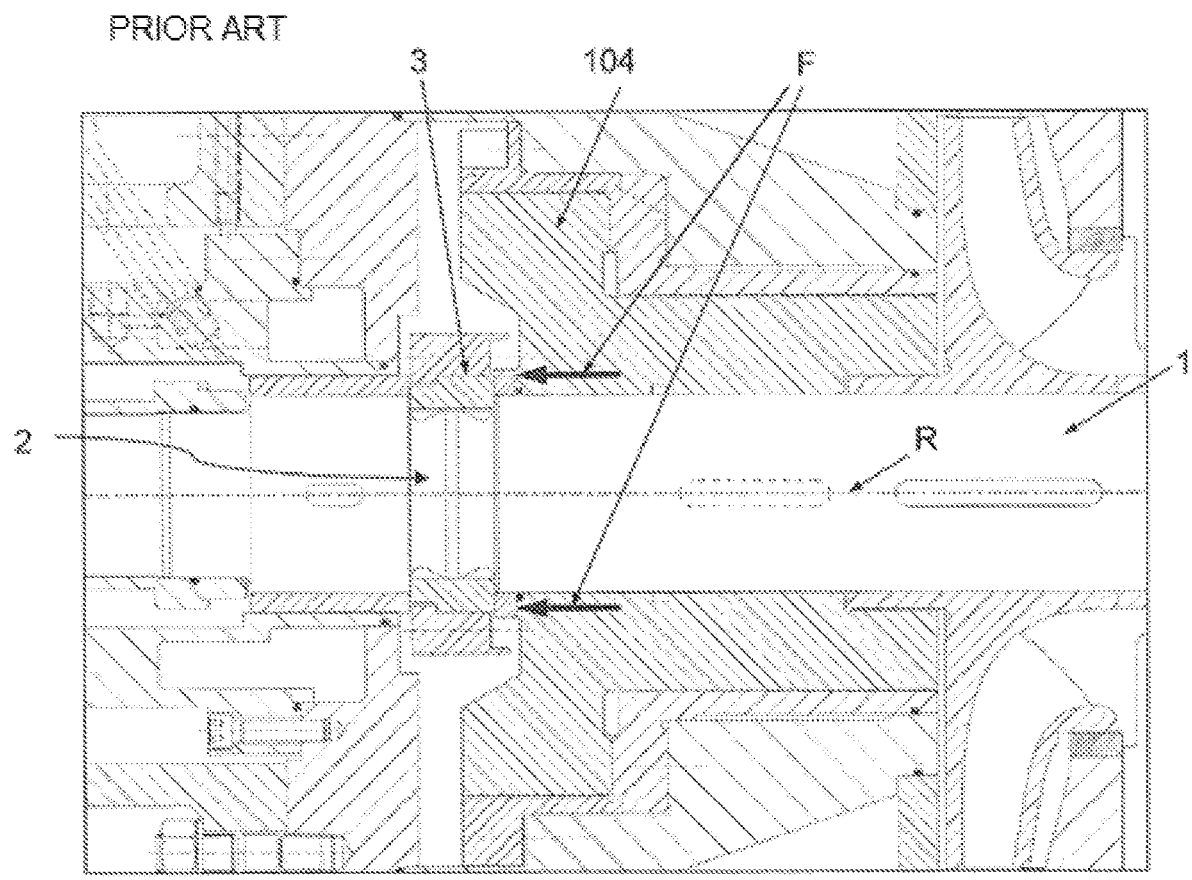
FIG. 2 shows an enlarged detail from FIG. 1 in the region A.

FIG. 2 shows an enlarged view of the region A from FIG. 1 in which the region around the groove 4 is illustrated on an enlarged scale. It can be seen that the axial thrust F typically transmitted by the piston 104 to the load-relieving device 3, i.e. the force F to be imparted to the pump shaft 1, is imparted to the pump shaft 1 via the groove region 2.

Figure 3:
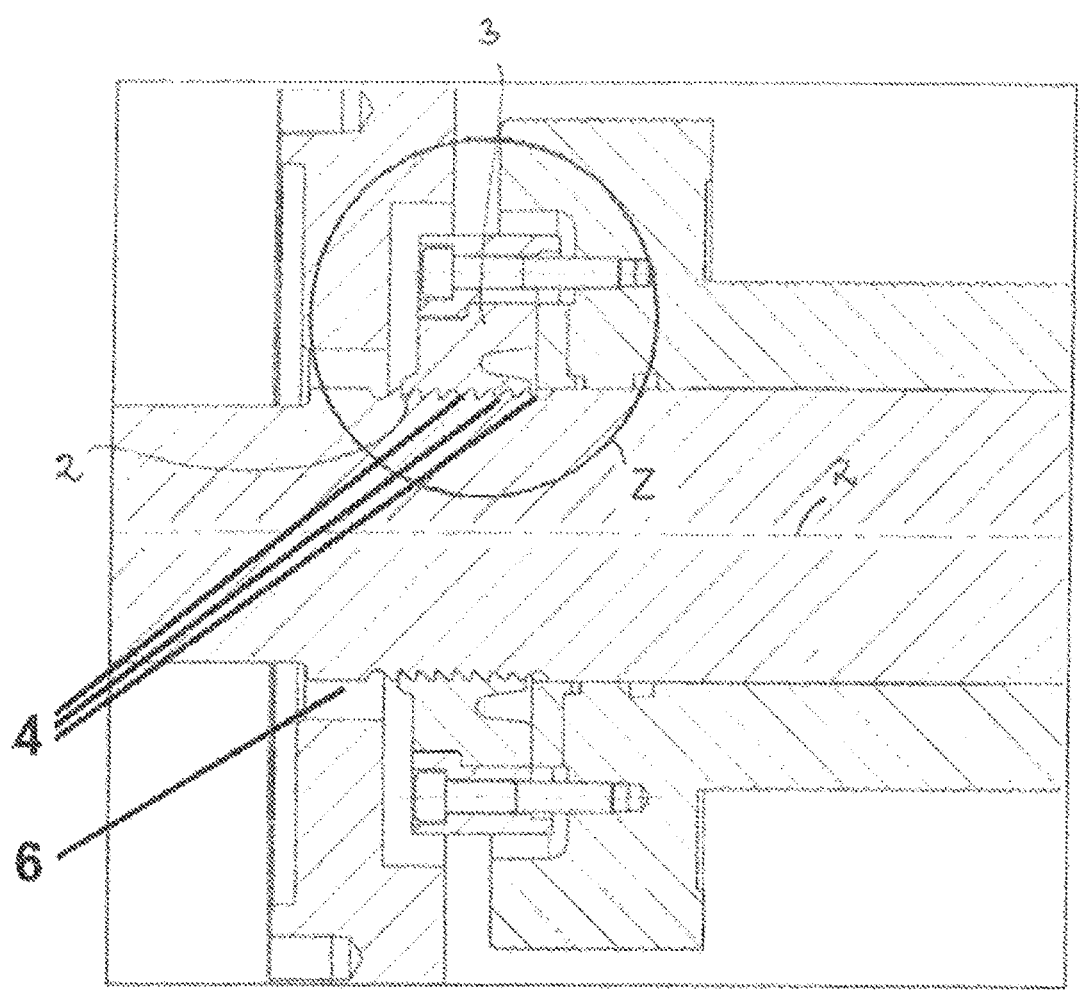
FIG. 3 shows an enlarged detail around the region of a retaining ring groove of a pump according to an embodiment of the invention.

FIG. 3 shows an embodiment according to the invention of the groove region 2, in which a plurality of grooves 4 for receiving the force F are now provided. The load-relieving device 3 is here provided with a corresponding design such that a thread element of the load-relieving device 3 engages in the respective grooves 4. This engagement causes the force F which is to be diverted to be imparted without penetrating particularly deep into the cross-section of the pump shaft 1. This is advantageous because a more stable pump shaft 1, the stability of which is significantly increased, is now present at this location in contrast to the implementation with just one groove.

It should be noted that the load-relieving device does not necessarily need to be configured so that it 100% complements the groove region.

Figure 4:
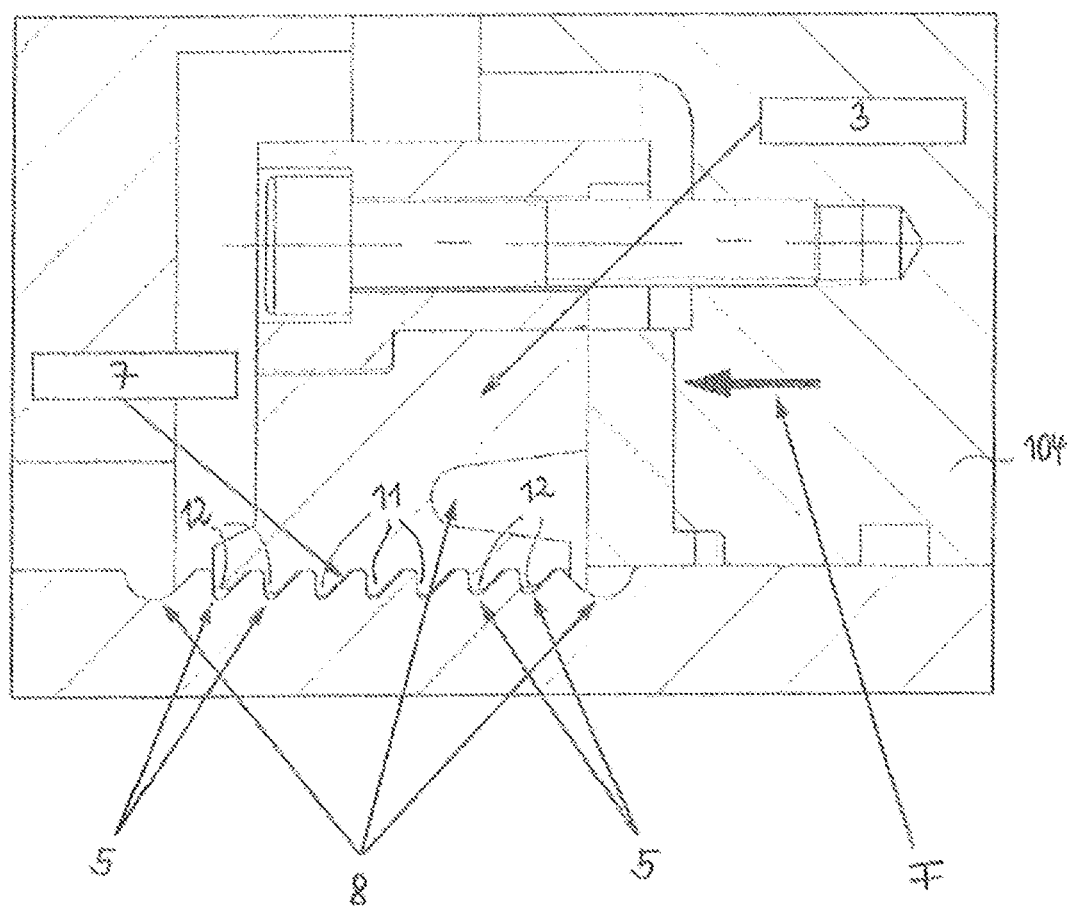
FIG. 4 shows an enlarged detail from FIG. 3 in the region Z.

As can be seen in FIG. 4, it can be advantageous for uniform imparting of the force F to the pump shaft 1 if the thread elements 11, 12 of the load-relieving device 3 has thread elements 12, which are shortened in the radial direction toward their outer edges, viewed in the direction of the longitudinal section, for engagement in the associated grooves 5. This is represented in the present case with the aid of a sawtooth design 7 (in the direction of the longitudinal section of the pump shaft).

The grooves 5 at the outer edges of the groove region 2 can here be designed with exactly the same depth as all the other grooves. It is, however, also possible that the grooves at the edge of the groove region 2, in particular at the edge facing the piston 104, are less deep than other grooves 4.

In particular, the grooves 5 which are arranged at the edge facing the piston 104 are provided, in their base with the shape of a segment of a circle, with a larger radius than the other grooves 4 arranged in the central region.

It can thus be provided that the two right-hand thread elements 12 are radially shortened such that the two corresponding grooves 5 in the shaft 1 need to be configured so that they are less deep and at the same time larger radii can be provided here in their groove bases 5. This reduces the stress in the grooves 4 of the shaft 1.

Load-relieving grooves 8 are furthermore also provided, in particular in the directly adjoining vicinity of the outer edges of the groove region 2. However, such a load-relieving groove 8 can also be provided in the load-relieving device 3 itself. It is then a recess there which gets larger toward the piston 104 and causes each of the thread elements 11, 12 to introduce the same amount of force into the respective associated groove 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pump shaft for a multi-stage pump, comprising:

a pump shaft having a circumferential groove region configured to receive and cooperate with a load-relieving device to impart a force acting in the axial direction of the pump shaft to the pump shaft, wherein the groove region in an axial direction of the pump shaft includes a plurality of grooves spaced apart from one another in the axial direction, the plurality of grooves are circumferential grooves separated from one another or are portions of a single-start or multi-start closed screwthread, a respective groove base of each of the plurality of grooves, viewed in the axial direction, has a shape of a segment of a circle, and radii of the groove bases of the plurality of grooves relative to an axis of rotation of the pump shaft are different, and the groove region is not tapered.

2. The pump shaft as claimed in claim 1, wherein a radius of one of the plurality of grooves adjacent to an outer edge of the groove region is larger than a radius of one of the plurality of grooves in a central section of the groove region.

3. The pump shaft as claimed in claim 1, wherein radii of the groove bases of the plurality of grooves relative to an axis of rotation of the pump shaft are different, and a groove base depth of one of the plurality of grooves arranged adjacent to an outer edge of the groove region is less than a groove base depth of a one of the plurality of grooves in a central section of the groove region.

4. The pump shaft as claimed in claim 1, wherein the plurality of grooves are separated from one another in the axial direction by pump shaft sections in the groove region, and pump shaft sections in the groove region have a radius from an axis of rotation of the pump shaft which coincides with a radius of the pump shaft adjacent to the groove region.

5. The pump shaft as claimed in claim 1, wherein the plurality of grooves having tooth tips form a sawtooth structure in the axial direction, and radii of the tooth tips of the sawtooth structure with respect to an axis of rotation of the pump shaft are the same.

6. The pump shaft as claimed in claim 5, wherein at least one tooth base of the sawtooth structure has a larger radius with respect to the axis of rotation of the pump shaft than a smaller radius of at least one other of the tooth bases of the sawtooth structure.

7. The pump shaft as claimed in claim 6, wherein the at least one other tooth base with the smaller radius is separated from an adjacent outer edge of the groove region by the at least one of the tooth bases with the larger radius, and the at least one other tooth base with the smaller radius is axially separated from the adjacent outer edge of the groove region and an outer edge at an axially opposite outer edge of the grove region by at least one of the tooth bases.

8. The pump shaft as claimed in claim 7, wherein
the at least one other tooth base with the smaller radius is axially separated from the
adjacent outer edge of the groove region and the outer edge at the axially opposite outer edge of the grove region by at least two tooth bases with larger radii than the smaller radius.

9. The pump shaft as claimed in claim 1, wherein
at least one load-relieving groove which does not receive and engage the load-relieving device is provided in the pump shaft adjacent the groove region.

10. The pump shaft as claimed in claim 9, wherein
the at least one load-relieving groove includes at two load-relieving grooves, and each of the two load-relieving grooves is located at respective opposite outer edge regions of the groove region.

11. A pump, comprising:
a pump shaft having a circumferential groove region; and
a load-relieving device,
wherein
the circumferential groove region is configured to receive and cooperate with the load-relieving device to impart a force acting in the axial direction of the pump shaft to the pump shaft,
the groove region in an axial direction of the pump shaft includes a plurality of grooves spaced apart from one another in the axial direction,
the plurality of grooves are circumferential grooves separated from one another or are portions of a single-start or multi-start closed screwthread,
a respective groove base of each of the plurality of grooves, viewed in the axial direction, has a shape of a segment of a circle,
radii of the groove base relative to an axis of rotation of the pump shaft are different, and
the groove region is not tapered.

12. The pump as claimed in claim 11, wherein
the load-relieving device is a ring configured to surrounds the pump shaft in the circumferential direction, and
an inner circumference of the load-relieving device is configured to engage in the plurality of grooves of the groove region of the pump shaft.

13. The pump as claimed in claim 12, wherein
the ring is a split ring.

14. The pump as claimed in claim 12, wherein
the inner circumference of the load-relieving device includes a plurality of thread elements configured to engage in at least one of the plurality of grooves in the groove region.

15. The pump as claimed in claim 14, wherein
at least one of the plurality of thread elements of the load-relieving device is radially shorter relative to an axis of rotation of the of the load-relieving device relative to another one of the plurality of thread elements, and
the at least one radially shorter one of the plurality of thread elements is configured to engage one of the plurality of grooves adjacent to at an outer edge of the groove region.

16. The pump as claimed in claim 15, wherein
the at least one radially shorter one of the plurality of thread elements includes two load-relieving grooves, and
each of the two radially shorter thread elements engage respective ones of the plurality of grooves located at respective opposite outer edge regions of the groove region.

17. A pump shaft for a multi-stage pump, comprising:
a pump shaft having a circumferential groove region configured to receive and cooperate with a load-relieving device to impart a force acting in the axial direction of the pump shaft to the pump shaft, wherein
the groove region in an axial direction of the pump shaft includes a plurality of grooves spaced apart from one another in the axial direction,
the plurality of grooves having tooth tips form a sawtooth structure in the axial direction,
radii of the tooth tips of the sawtooth structure with respect to an axis of rotation of the pump shaft are the same, and
at least one tooth base of the sawtooth structure has a larger radius with respect to the axis of rotation of the pump shaft than a smaller radius of at least one other of the tooth bases of the sawtooth structure.

18. A pump, comprising:
a pump shaft having a circumferential groove region; and
a load-relieving device,
wherein
the circumferential groove region is configured to receive and cooperate with the load-relieving device to impart a force acting in the axial direction of the pump shaft to the pump shaft,
the groove region in an axial direction of the pump shaft includes a plurality of grooves spaced apart from one another in the axial direction,
an inner circumference of the load-relieving device is configured to engage in the plurality of grooves of the groove region of the pump shaft,
the inner circumference of the load-relieving device includes a plurality of thread elements configured to engage in at least one of the plurality of grooves in the groove region,
at least one of the plurality of thread elements of the load-relieving device is radially shorter relative to an axis of rotation of the of the load-relieving device relative to another one of the plurality of thread elements, and
the at least one radially shorter one of the plurality of thread elements is configured to engage one of the plurality of grooves adjacent to at an outer edge of the groove region.

* * * * *